(12) United States Patent
Levesque

(10) Patent No.: US 9,156,405 B1
(45) Date of Patent: Oct. 13, 2015

(54) SUPPLEMENTAL STEP ASSEMBLY FOR A VEHICLE AND METHOD OF USE

(71) Applicant: Guy Charles Levesque, Grosse Ile, MI (US)

(72) Inventor: Guy Charles Levesque, Grosse Ile, MI (US)

(*) Notice: Subject to any disclaimer, the term of this patent is extended or adjusted under 35 U.S.C. 154(b) by 0 days.

(21) Appl. No.: 14/598,807

(22) Filed: Jan. 16, 2015

Related U.S. Application Data

(60) Provisional application No. 61/965,785, filed on Feb. 7, 2014.

(51) Int. Cl.
B60R 3/00 (2006.01)

(52) U.S. Cl.
CPC .......................................... B60R 3/00 (2013.01)

(58) Field of Classification Search
CPC ............ B60R 3/00; B60R 3/002; B60R 3/007
USPC ..................... 280/163, 164.1, 164.2, 166, 169
See application file for complete search history.

(56) References Cited

U.S. PATENT DOCUMENTS

| | | | | |
|---|---|---|---|---|
| 665,900 A * | 1/1901 | Hamilton | ........................ | 182/90 |
| 1,134,032 A * | 3/1915 | Clarke | ............................. | 182/93 |
| 2,981,554 A * | 4/1961 | Mulder et al. | .............. | 280/164.1 |
| 2,991,118 A * | 7/1961 | Sleger | ............................. | 296/62 |
| 3,603,429 A * | 9/1971 | Shepherd | ........................ | 182/91 |
| 4,102,432 A * | 7/1978 | Bustin | ............................. | 182/92 |
| 4,161,232 A * | 7/1979 | Bustin | ............................. | 182/92 |
| 4,266,792 A * | 5/1981 | Sanders et al. | ................ | 280/848 |
| D292,388 S * | 10/1987 | Weiler | ........................ | D12/203 |
| D293,667 S * | 1/1988 | Weiler | ........................ | D12/203 |
| 4,753,447 A * | 6/1988 | Hall | ............................... | 280/163 |
| 4,785,910 A * | 11/1988 | Tonkovich | ....................... | 182/92 |
| 4,825,975 A * | 5/1989 | Symes | ............................. | 182/92 |
| 5,007,654 A * | 4/1991 | Sauber | ........................... | 280/166 |
| 5,054,799 A * | 10/1991 | Fingerle | ..................... | 280/164.1 |
| 5,139,295 A * | 8/1992 | Escobedo | ..................... | 293/117 |
| 5,265,896 A * | 11/1993 | Kravitz | ......................... | 280/163 |
| 5,799,961 A * | 9/1998 | Schmeets | ...................... | 280/163 |
| 5,816,616 A * | 10/1998 | Boyd | ............................ | 280/847 |
| 5,895,064 A * | 4/1999 | Laubach | ....................... | 280/163 |
| 6,076,844 A * | 6/2000 | Stuart et al. | ................... | 280/163 |
| 6,145,861 A * | 11/2000 | Willis | ........................... | 280/163 |

(Continued)

FOREIGN PATENT DOCUMENTS

| | | | |
|---|---|---|---|
| DE | 19642551 A1 | * | 4/1997 |
| DE | 102008016057 | * | 11/2008 |
| WO | WO 2006097585 A1 | * | 9/2006 |

*Primary Examiner* — Brodie Follman
*Assistant Examiner* — Jacob Meyer
(74) *Attorney, Agent, or Firm* — Ted Masters

(57) ABSTRACT

A supplemental step assembly for a vehicle having a vehicle step includes a step which has a first end and an opposite second end. A first side member has a first step end which is connectable to the first end of the step, and an opposite first vehicle step end which is connectable to the vehicle step, the first step end being offset from the first vehicle step end. A second side member has a second step end which is connectable to the second end of the step, and an opposite second vehicle step end which is connectable to the vehicle step, the second step end being offset from the second vehicle step end. The supplemental step assembly can be connected to the step of the vehicle in either an upward projecting direction or a downward projection direction. The supplemental step assembly provides an additional step which reduces the vertical step height and facilitates entry of the vehicle.

6 Claims, 12 Drawing Sheets

(56) References Cited

U.S. PATENT DOCUMENTS

| | | | | |
|---|---|---|---|---|
| 6,457,558 | B1* | 10/2002 | Ehnes | 182/150 |
| 6,481,733 | B1* | 11/2002 | Shellabarger | 280/163 |
| 6,655,706 | B1* | 12/2003 | Murrell | 280/166 |
| D494,117 | S* | 8/2004 | Ruffin | D12/203 |
| 7,044,487 | B2* | 5/2006 | Byrne | 280/163 |
| 7,185,381 | B1* | 3/2007 | Heartsill et al. | 14/71.1 |
| 7,350,610 | B2* | 4/2008 | Kikuchi | 180/68.5 |
| 8,720,924 | B2* | 5/2014 | Ruehl | 280/164.1 |
| 8,967,650 | B1* | 3/2015 | Majors | 280/163 |
| 2003/0025289 | A1* | 2/2003 | Furuhashi et al. | 280/163 |
| 2003/0071433 | A1* | 4/2003 | Rammer, Jr. | 280/163 |
| 2004/0061301 | A1* | 4/2004 | Andrews | 280/163 |
| 2004/0178602 | A1* | 9/2004 | King et al. | 280/163 |
| 2007/0108718 | A1* | 5/2007 | Ruehl | 280/163 |
| 2009/0322052 | A1* | 12/2009 | Ruehl | 280/166 |
| 2010/0012431 | A1* | 1/2010 | Ehnes | 182/150 |
| 2010/0019468 | A1* | 1/2010 | Price | 280/165 |
| 2010/0025954 | A1* | 2/2010 | Gottlinger et al. | 280/166 |
| 2011/0285104 | A1* | 11/2011 | Wotherspoon | 280/164.1 |
| 2014/0327222 | A1* | 11/2014 | Iorgovan | 280/163 |

* cited by examiner

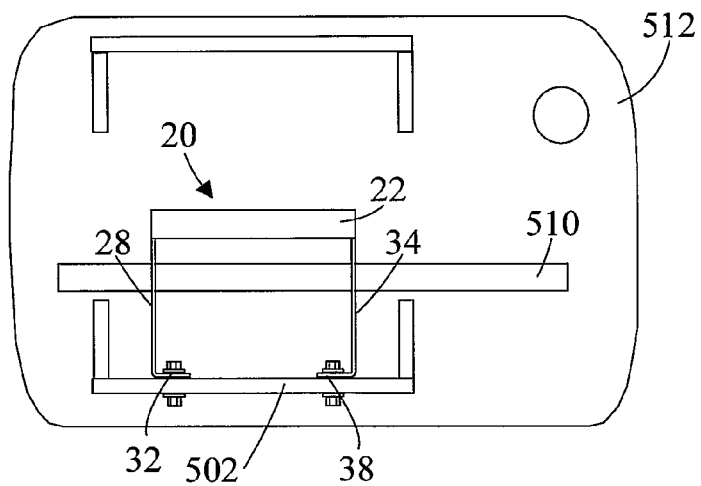
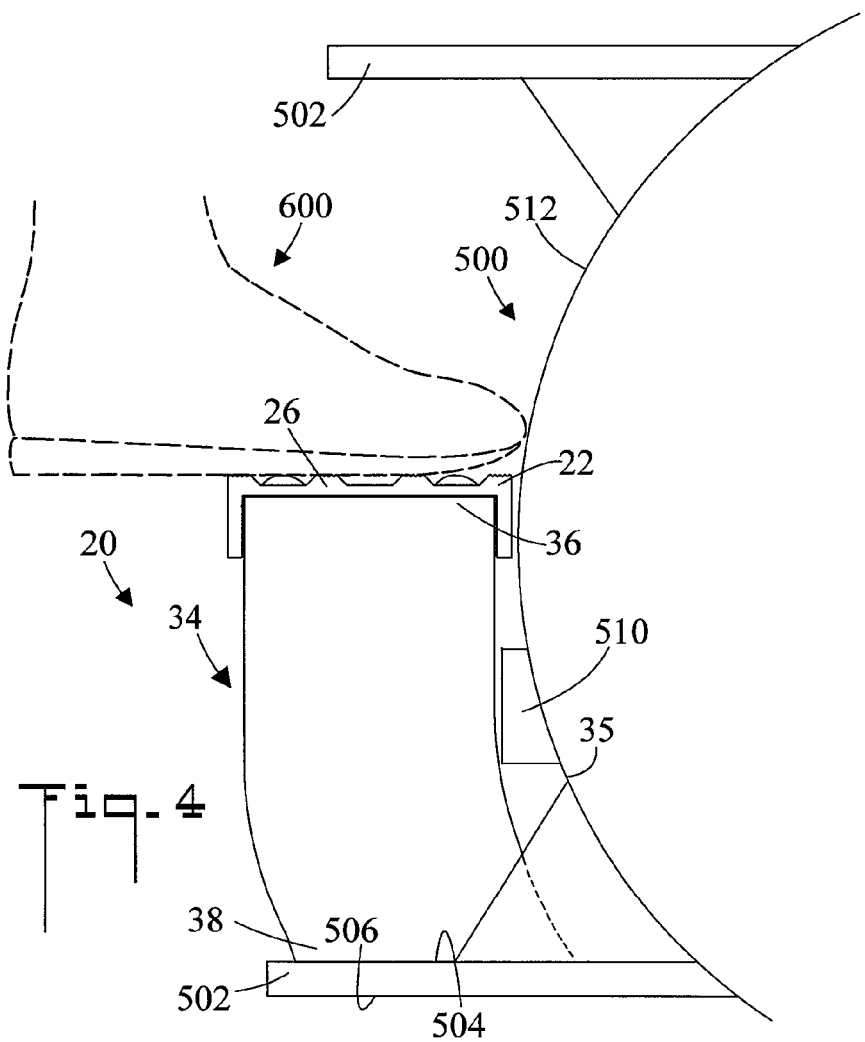

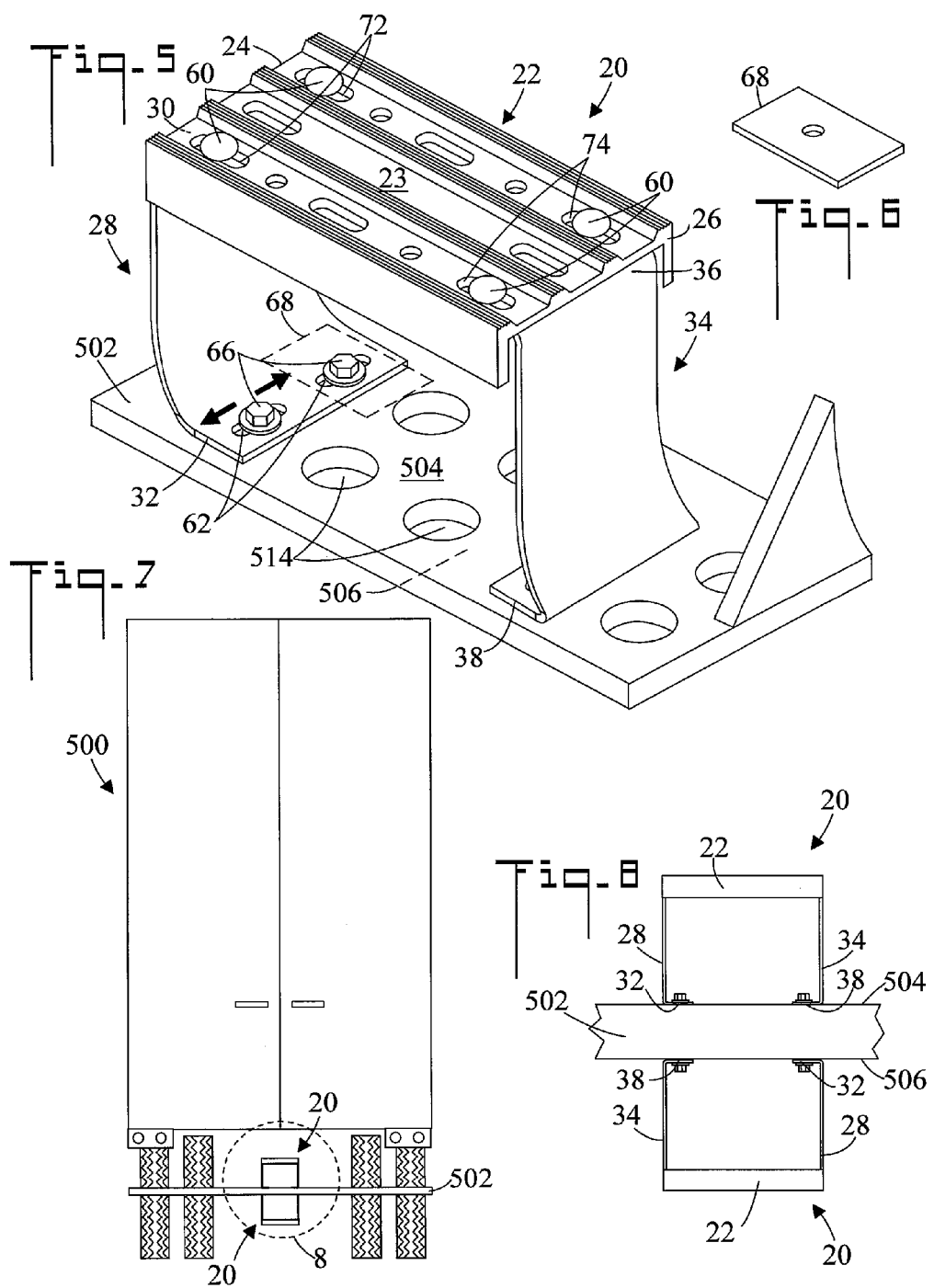

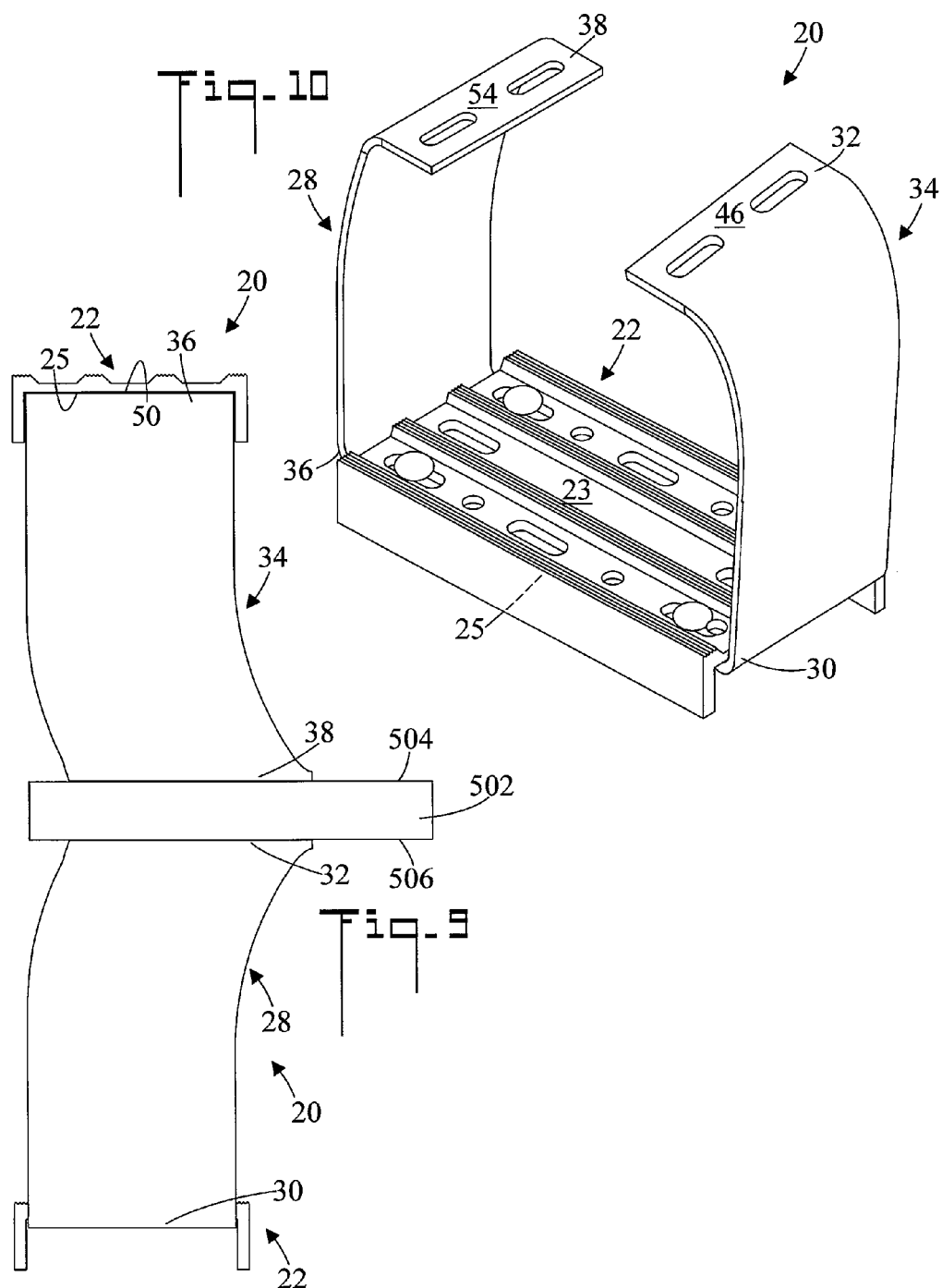

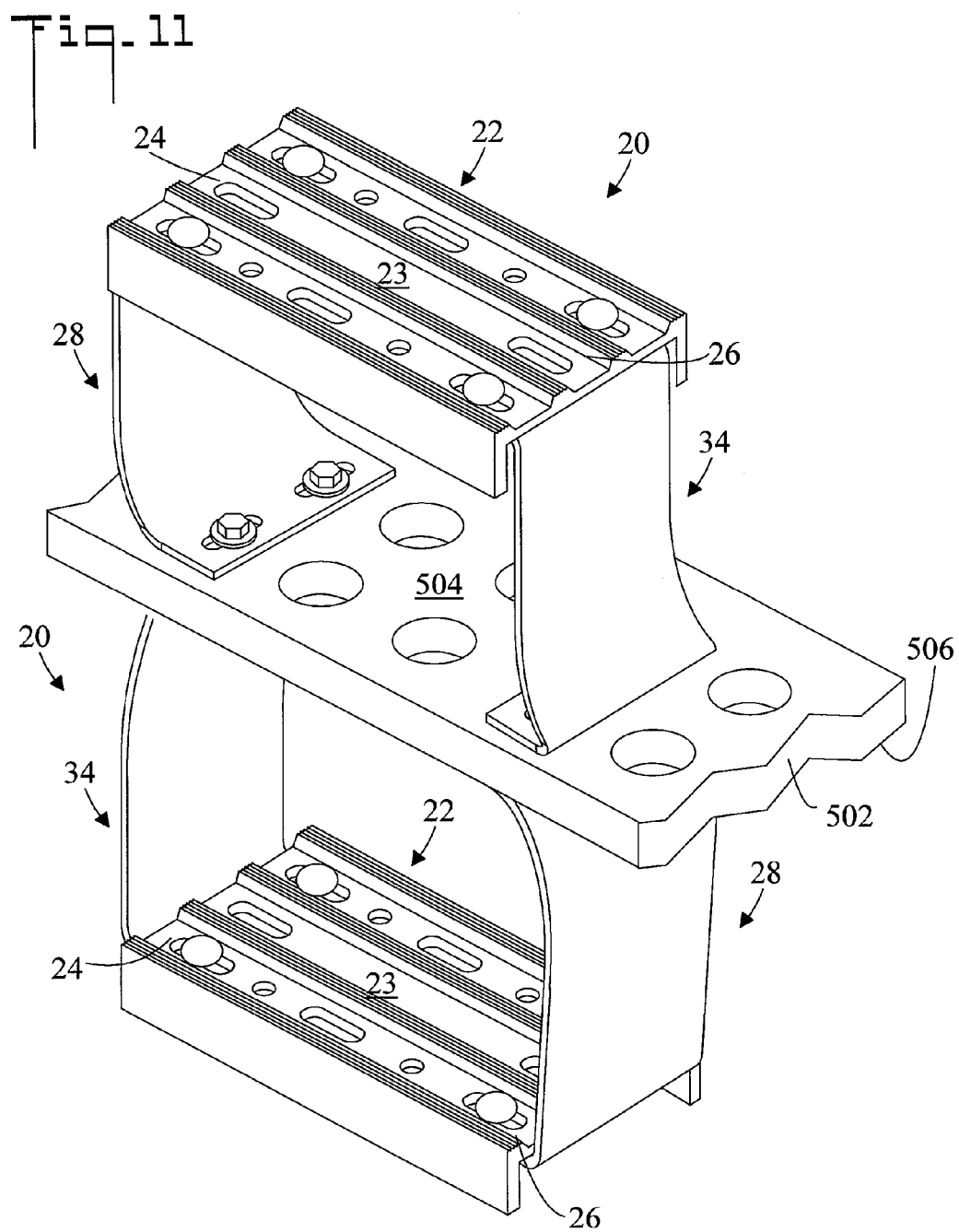
Fig_11

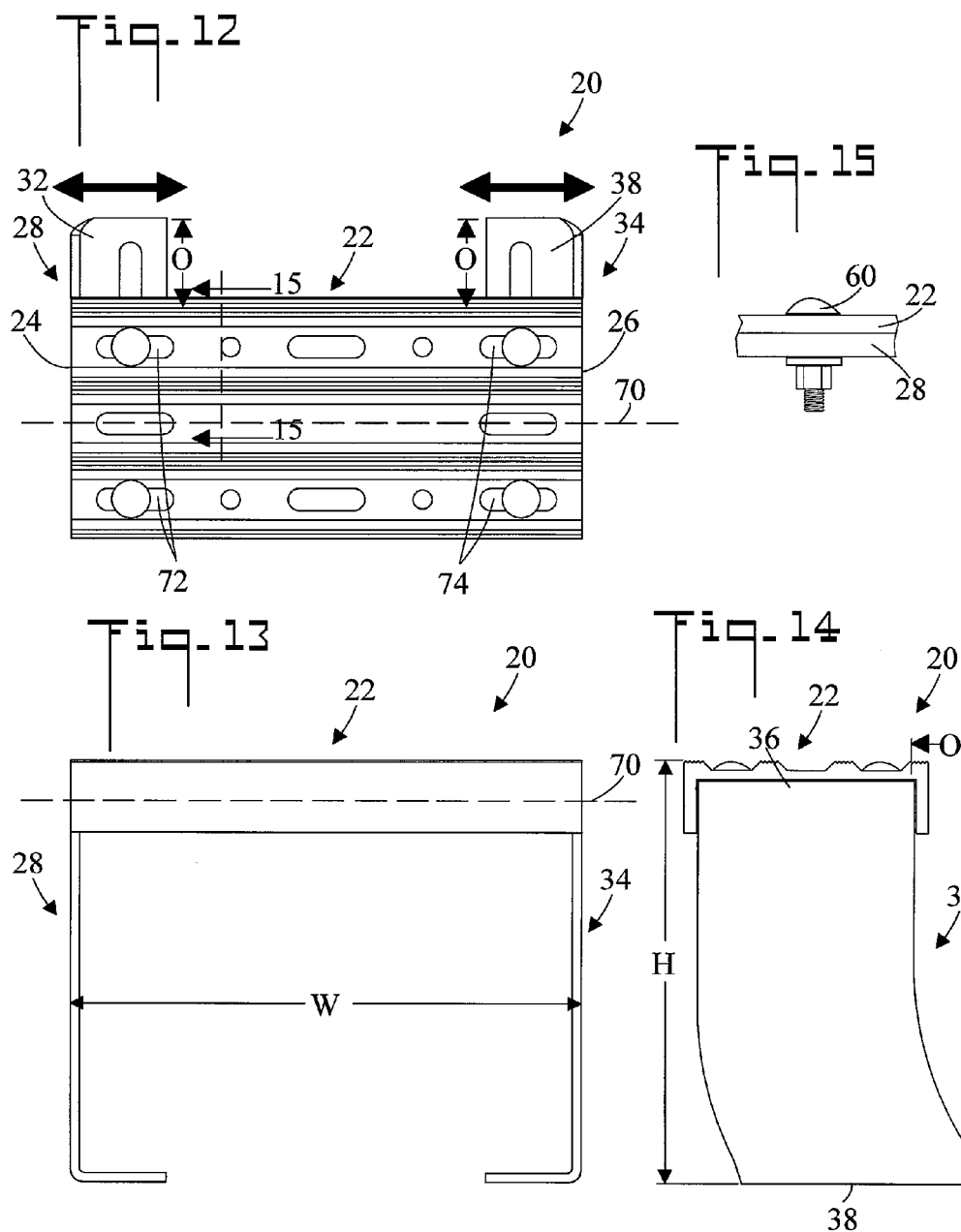

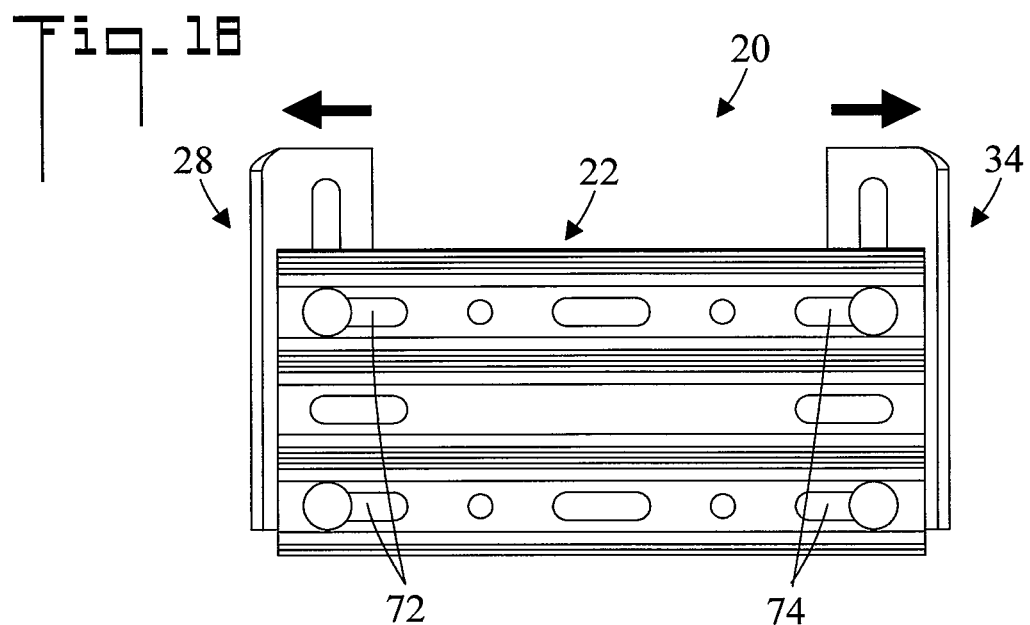
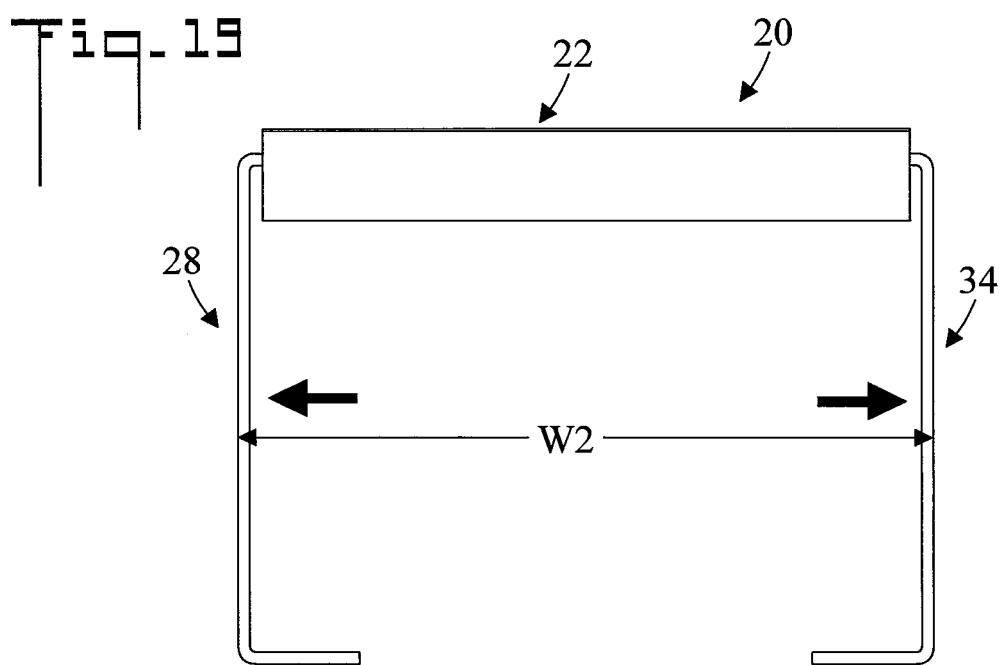

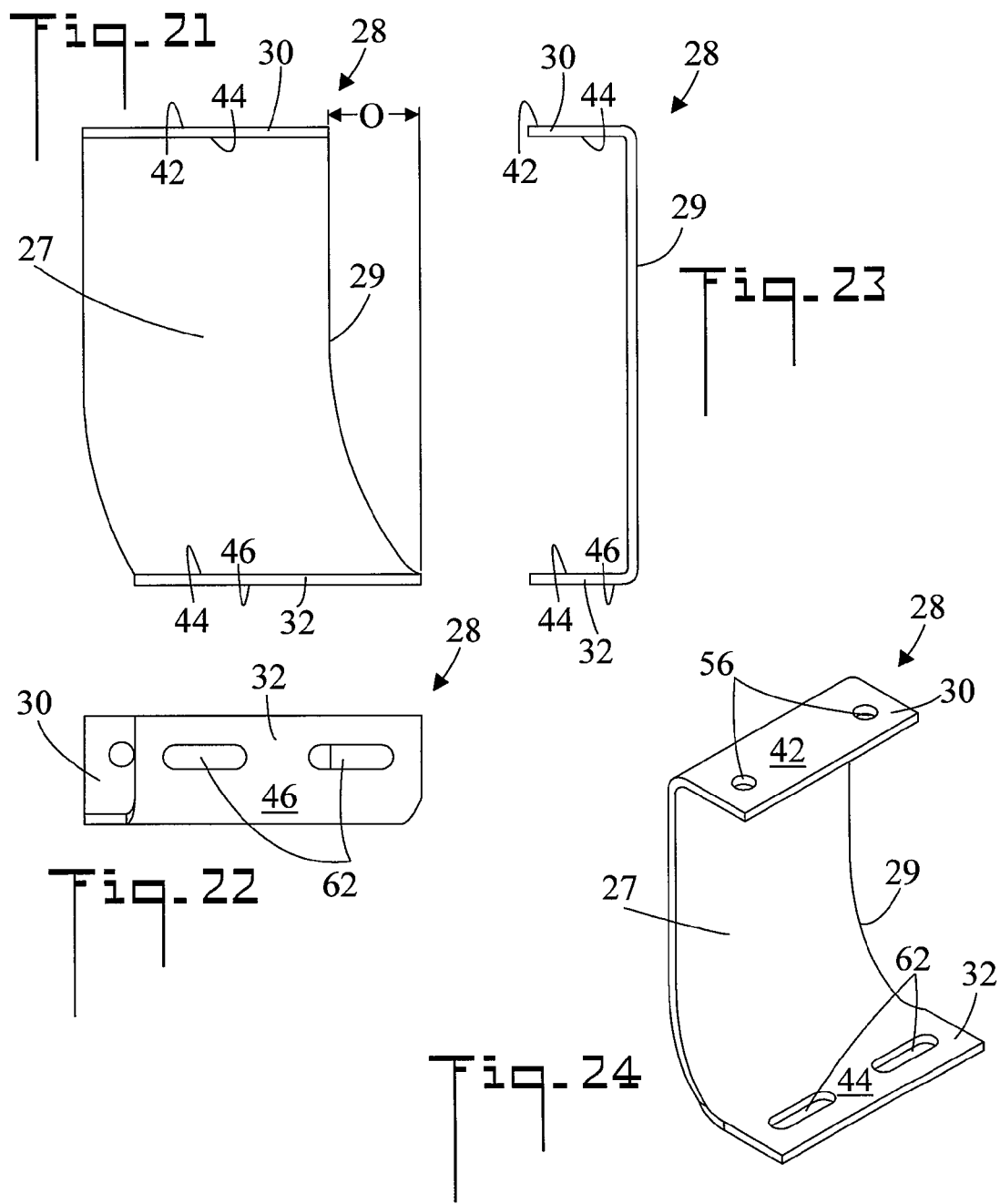

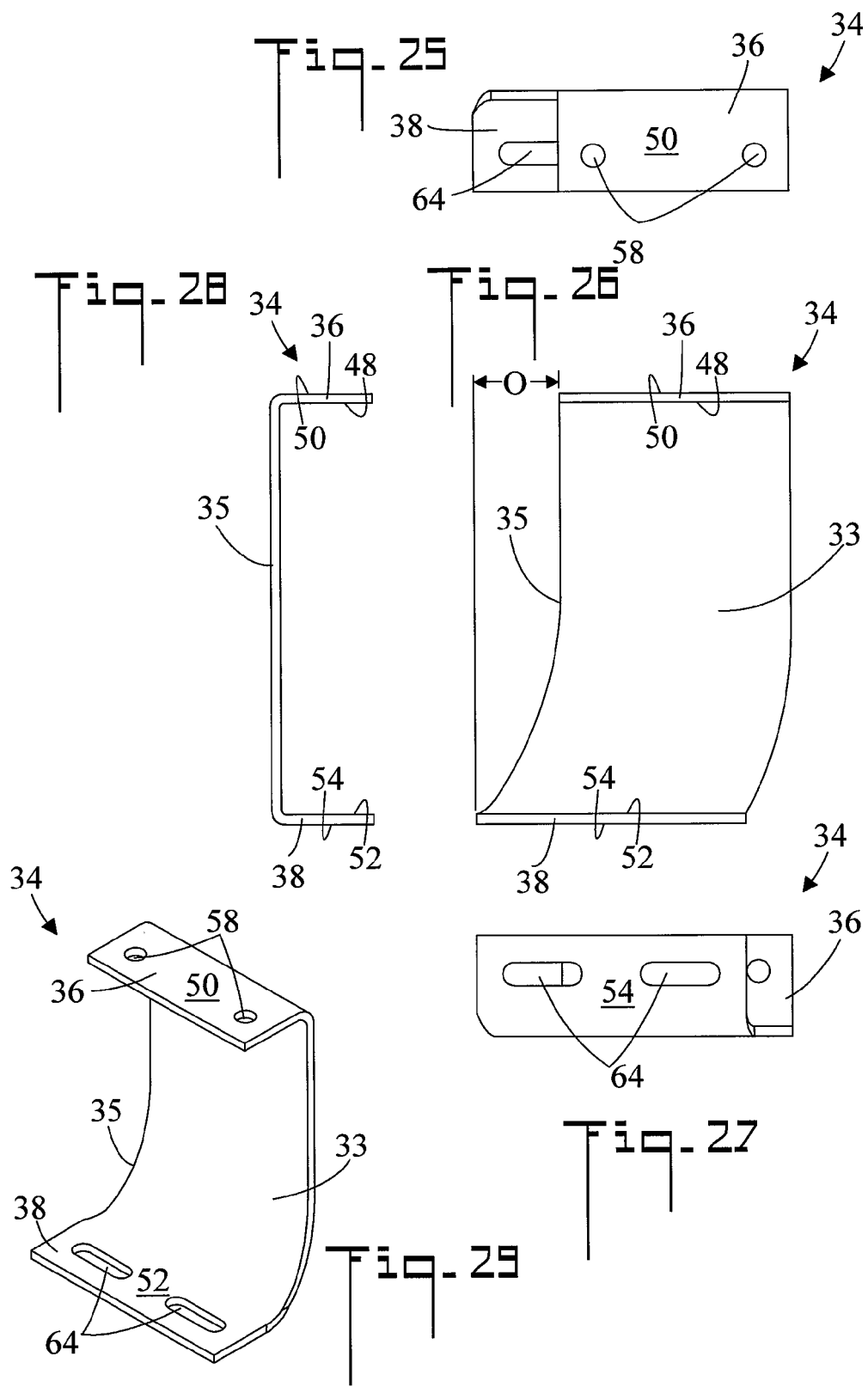

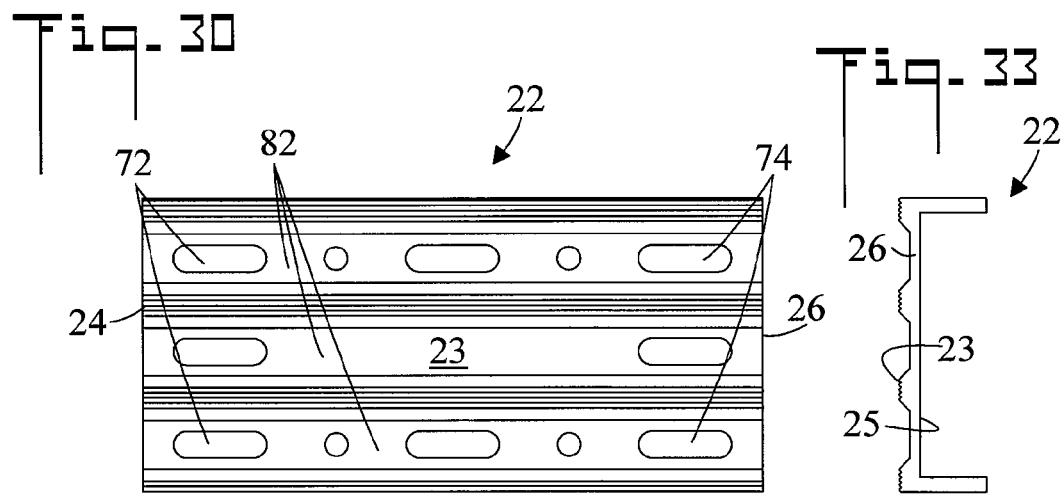
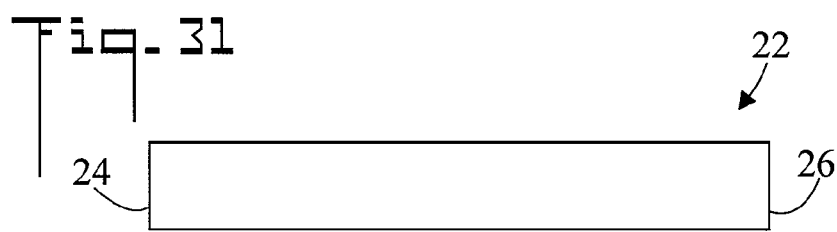
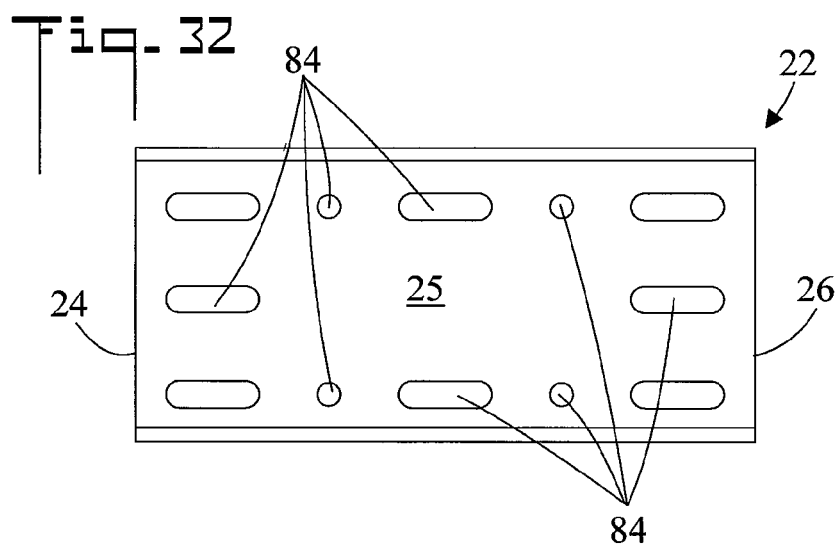

SUPPLEMENTAL STEP ASSEMBLY FOR A VEHICLE AND METHOD OF USE

CROSS REFERENCE TO RELATED APPLICATION

This application claims the filing benefit under 35 U.S.C. §119(e) of U.S. Provisional Application No. 61/965,785, filed Feb. 7, 2014, which is hereby incorporated by reference.

TECHNICAL FIELD

The present invention pertains generally to vehicles such as trucks, and more particularly to a supplemental step assembly which facilitates climbing up into the vehicle.

BACKGROUND OF THE INVENTION

Many vehicles such as large trucks are built high above the ground. As such the occupants of the vehicle are required to climb a high vertical distance in order to enter the cab or cargo area of the vehicle. Steps are usually provided by the manufacturer; however the steps are spaced apart a large vertical distance making it physically challenging to climb up and into the vehicle. This vertical climb can result in physical stress and even injuries.

For example, most large trucks have factory installed steps ranging from 18 to 22 vertical inches between the stair treads. However, the average and normal stair height to climb a stair is about 8 inches. As such, some users using factory installed steps climb into their trucks with great difficulty, and some have even fallen from the step while climbing. Some users are overweight, older, short, or in some way physically challenged. They are forced to use upper body strength to climb up into the cab, and each time they climb the factory steps their knee is stretched up to their chest so that the foot can elevate the difficult distance needed to reach the top factory step. When leaving the truck the user's hands slide down a grab-bar, which is somewhat like sliding down a fire pole as the user drops from the top step to the bottom step. Any misstep or hand slip could result in a fall and serious injury. Lastly many people have personal health issues which keep them from returning to work (e.g. surgery or a sprain). Their return can be delayed because of the necessity of using steps having a large vertical distance.

BRIEF SUMMARY OF THE INVENTION

The supplemental step assembly described herein reduces the aforementioned problems associated with entering vehicles. In one embodiment it does so by providing an intermediate step which is located approximately half way between the factory installed steps. As such the supplemental step assembly reduces the vertical distance which a user must climb in one step. This additional step reduces the physical strain placed upon the user, is safer and will reduce entry-related injuries, and greatly assists smaller and physically challenged users.

The supplemental step assembly comprises a universal multipurpose step which mounts to existing vehicle such as trucks and trailers in multiple locations in order to provide an intermediate step. Additionally, the supplemental step can be used in other non-vehicle applications where an intermediate step would be useful.

The supplemental step assembly includes a step which is connected to two side members. The ends of the side members are connected to the existing step of the vehicle. In one configuration the supplemental step assembly is connected to vehicle step so that it projects upward from the vehicle step. In another configuration the supplemental step assembly is connected to the vehicle step so that it projects downward from the vehicle step.

The supplemental step assembly has an offset design so that when installed on the vehicle it angles out and away from the vehicle. This slanted design reduces interference with the vehicle and any obstructions located in the mounting area. Also, the edges of the side members have a concave curve to further avoid vehicle obstructions.

Some features of the supplemental step assembly include:
Easy to assemble and install using nuts and bolts.
Step can be mounted in different positions on the side members to allow different installation configurations.
Both the connection of the step to the side members and the connection of the side members to the vehicle step can be adjusted.
It can be mounted to the top or bottom of the existing vehicle step.
Relieves stress on the body from climbing by shortening the stepping distances.
Reduces personal injuries from falling and can prevent strains.
Allows physically challenged people to climb easier.
Step treads are designed to help prevent slipping with a gripping design to dig into the bottom of a shoe. Also the gripping tread is elevated to allow troughs to collect water and allow drainage through holes.
The supplemental step assembly is made from aluminum making it light weight, strong, and rust proof.

In accordance with an embodiment, a supplemental step assembly for a vehicle which has a vehicle step includes a step which has a first end and an opposite second end. A first side member has a first step end which is connectable to the first end of the step, and an opposite first vehicle step end which is connectable to the vehicle step, the first step end is offset from the first vehicle step end. A second side member has a second step end which is connectable to the second end of the step, and an opposite second vehicle step end which is connectable to the vehicle step, the second step end is offset from the second vehicle step end.

In accordance with another embodiment, the vehicle has an obstruction. The first side member has a concave first edge, and the second side member has a concave second edge. The concave first and second edges are shaped and dimensioned to avoid the obstruction.

In accordance with another embodiment, the first step end is a first step flange which is connectable to the first end of the step, the first step flange having an inside surface and an opposite outside surface. The first vehicle step end is a first vehicle flange which is connectable to the vehicle step, the first vehicle flange has an inside surface and an opposite outside surface. The second step end is a second step flange which is connectable to the second end of the step, the second step flange has an inside surface and an opposite outside surface. The second vehicle step end is a second vehicle flange which is connectable to the vehicle step, the second vehicle flange has an inside surface and an opposite outside surface.

In accordance with another embodiment, the first step flange has at least one mounting hole for connecting the first step flange to the step, and the second step flange has at least one mounting hole for connecting the second step flange to the step.

In accordance with another embodiment, the first vehicle flange includes at least one first vehicle step adjustment slot for connecting the first vehicle flange to the vehicle step, and the second vehicle flange includes at least one second vehicle step adjustment slot for connecting the second vehicle flange to the vehicle step.

In accordance with another embodiment, the vehicle step has a top surface and an opposite bottom surface. The step has a top surface and an opposite bottom surface. The first side member is connectable to the first end of the step so that the outside surface of the first step flange abuts the bottom surface of the step. The first side member is connectable to the vehicle step so that the outside surface of the first vehicle flange abuts the top surface of the vehicle step. The second side member is connectable to the second end of the step so that the outside surface of the second step flange abuts the bottom surface of the step. The second side member is connectable to the vehicle step so that the outside surface of the second vehicle flange abuts the top surface of the vehicle step. When the supplemental step assembly is so connected, the step upwardly projects from the vehicle step.

In accordance with another embodiment, the vehicle step has a top surface and an opposite bottom surface. The step has a top surface and an opposite bottom surface. The first side member is connectable to the step so that the inside surface of the first step flange abuts the bottom surface of the step. The first side member is connectable to the vehicle step so that the outside surface of the first vehicle flange abuts the bottom surface of the vehicle step. The second side member is connectable to the step so that the inside surface of the second step flange abuts the bottom surface of the step. The second side member is connectable to the vehicle step so that the outside surface of the second vehicle flange abuts the bottom surface of the vehicle step. When the supplemental step assembly is so connected, the step downwardly projects from the vehicle step.

In accordance with another embodiment, the first and second side members are the mirror image of one another.

In accordance with another embodiment, the first and second side members are connectable to the step and to the vehicle step so that (1) the step can project upwardly from the vehicle step, or (2) the step can project downwardly from the vehicle step.

In accordance with another embodiment, the step has a longitudinal axis. The step includes at least one first adjustment slot disposed near the first end and oriented parallel to the longitudinal axis. The first adjustment slot for adjusting the longitudinal position of the first side member along the step. The step includes at least one second adjustment slot disposed near the second end and oriented parallel to the longitudinal axis. The second adjustment slot for adjusting the longitudinal position of the second side member along the step.

In accordance with another embodiment, the first side member includes a first vehicle flange which has at least one first vehicle step adjustment slot for connecting the first vehicle flange to the vehicle step. The second side member includes a second vehicle flange which has at least one second vehicle step adjustment slot for connecting the second vehicle flange to the vehicle step. When the first and second side members are connected to the step, the first and second adjustment slots of the step are oriented perpendicular to the first and second vehicle step adjustment slots of the side members.

Other embodiments, in addition to the embodiments enumerated above, will become apparent from the following detailed description, taken in conjunction with the accompanying drawings, which illustrate, by way of example, the principles of the supplemental step assembly and method of use.

BRIEF DESCRIPTION OF THE DRAWINGS

FIG. 3 is an enlarged view of area 3 of FIG. 2;
FIG. 4 is a fragmented side elevation view of the supplemental step assembly connected to the vehicle step of the vehicle;
FIG. 5 is a fragmented perspective view of the supplemental step assembly connected to the vehicle step of the vehicle;
FIG. 6 is a perspective view of a special washer;
FIG. 7 is a reduced rear elevation view of two supplemental step assembles connected to the vehicle step;
FIG. 8 is an enlarged view of area 8 of FIG. 7;
FIG. 9 is a side elevation view of FIG. 8;
FIG. 10 is a perspective view of the supplemental step assembly configured for connection below a vehicle step as in FIG. 9;
FIG. 11 is a perspective view of two supplemental step assemblies connected to the vehicle step;
FIG. 12 is a top plan view of the supplemental step assembly;
FIG. 13. is a side elevation view of the supplemental step assembly;
FIG. 14 is an end elevation view of the supplemental step assembly;
FIG. 15 is a view along line 15-15 of FIG. 12;
FIG. 18 is a top plan view of the supplemental step assembly showing another longitudinal adjustment of the two side members;
FIG. 19 is a side elevation view of the other longitudinal adjustment of the two side members;
FIG. 20 is a top plan view of a first side member;
FIG. 21 is an end elevation view of the first side member;
FIG. 22 is a bottom plan view of the first side member;
FIG. 23 is a side elevation view of the first side member;
FIG. 24 is a perspective view of the first side member;
FIG. 25 is a top plan view of a second side member;
FIG. 26 is an end elevation view of the second side member;
FIG. 27 is a bottom plan view of the second side member;
FIG. 28 is a side elevation view of the second side member;
FIG. 29 is a perspective view of the second side member;
FIG. 30 is a top plan view of a step;
FIG. 31 is a side elevation view of the step;
FIG. 32 is a bottom plan view of the step;
FIG. 33 is an end elevation view of the step; and,
FIG. 34 is a top plan view of the vehicle with the supplemental step assembly connected.

DETAILED DESCRIPTION OF THE INVENTION

Figure 1:
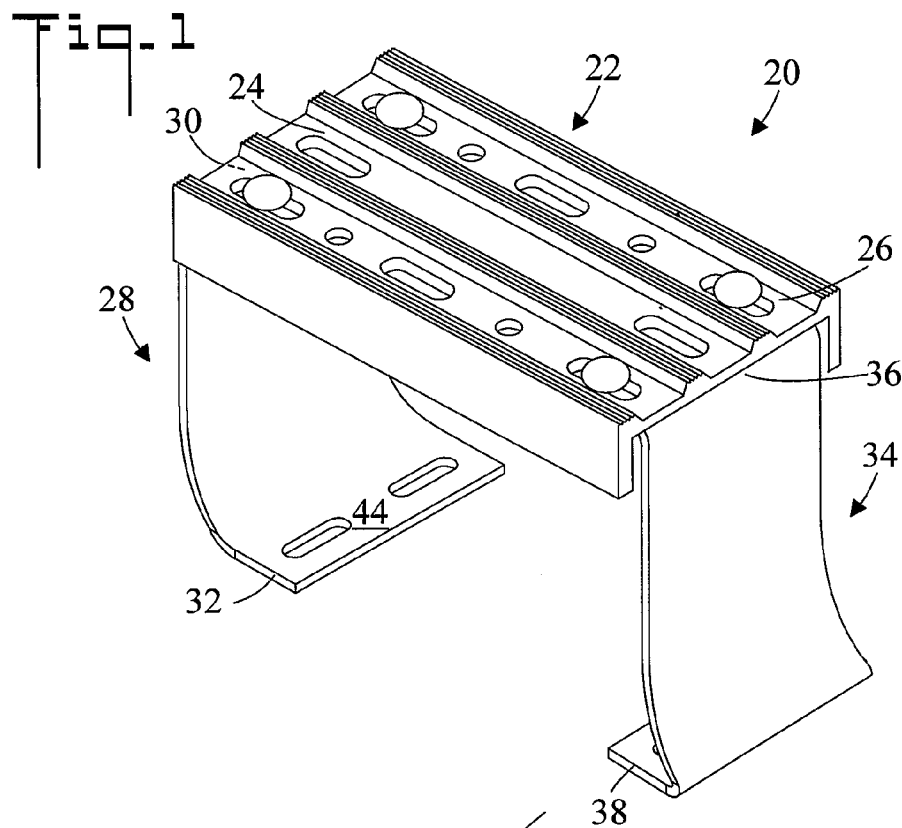
FIG. 1 is a perspective view of a supplemental step assembly.

Referring initially to FIG. 1 there is illustrated a perspective view of a supplemental step assembly, generally designated as 20. FIGS. 2-5 are various views showing supplemental step assembly 20 connected to the vehicle step 502 of a vehicle 500. Vehicle 500 is disposed upon a horizontal support surface 550 such as a road so that vehicle step 502 is substantially horizontal. Supplemental step assembly 20 includes a step 22 which has a first end 24 and an opposite second end 26. As used herein the term "end" means either the end extremity of step 22 or a part of step 22 which is near the end extremity. A first side member 28 (refer also to FIGS. 20-24) has a first step end 30 which is connectable to first end 24 of step 22, and an opposite first vehicle step end 32 which is connectable to vehicle step 502. First step end 30 is offset from first vehicle step end 32. As used herein the term "offset" means that first step end 30 and first vehicle step end 32 are relatively disposed so that when supplemental step assembly 20 is connected to step 502 of vehicle 500 first side member 28 angles out away from vehicle 500 (refer also to FIG. 4). Referring also to FIGS. 12, 14, 22, and 34, in the shown embodiment first step end 30 is offset a distance O from first vehicle step end 32. Similarly, supplemental step assembly 20 further includes a second side member 34 (refer also to FIGS. 25-29) which has a second step end 36 which is connectable to second end 26 of step 22, and an opposite second vehicle step end 38 which is connectable to vehicle step 502. As with first side member 28, second step end 36 is offset (a distance O) from second vehicle step end 38. It is noted that second side member 34 is the mirror image of first side member 28.

It is further noted that the offset arrangement of step ends and vehicle step ends of the side members serves a useful purpose. When supplemental step assembly 20 is connected to the vehicle step 502 of a vehicle 500, supplemental step assembly 20 including step 22 angles out away from vehicle 500 so that it avoids any obstructions 510 which may be located near vehicle step 502 (refer to FIGS. 4 and 34) and the associated discussion below). This features makes it possible to connect supplemental step 20 to vehicles which could not accommodate a step which was not outwardly angled. Moreover, step 22 juts out away from vehicle 500 which facilitates access by the user.

In the shown embodiment, left and right 90° flanges are utilized to connect the side members 28 and 34 to step 22 and to vehicle step 502. Also referring to FIGS. 20-24 and 25-29, first step end is a first step flange 30 which is connectable to first end 24 of step 22. First step flange 30 has an inside surface 40 and an opposite outside surface 42. First vehicle step end is a first vehicle flange 32 which is connectable to the vehicle step 502, first vehicle flange 32 has an inside surface 44 and an opposite inside surface 46. Similarly, second step end is a second step flange 36 which is connectable to second end 26 of step 22, second step flange 36 has an inside surface 48 and an opposite outside surface 50. Second vehicle step end is a second vehicle flange 38 which is connectable to vehicle step 502, second vehicle flange 38 has an inside surface 52 and an opposite outside surface 54.

The upward connection of step 22 to side members 28 and 34 of supplemental step assembly 20 to vehicle step 502 is shown in FIG. 5. Vehicle step 502 has a top surface 504 and an opposite bottom surface 506. Step 22 has a top surface 23 and an opposite bottom surface 25 (refer also to FIG. 32). First side member 28 is connectable to first end 24 of step 22 so that outside surface 42 of first step flange 30 abuts bottom surface 25 of step 22. First side member 28 is connected to vehicle step 502 so that outside surface 46 of first vehicle flange 32 abuts top surface 506 of vehicle step 502. Similarly, second side member 34 is connectable to second end 26 of step 22 so that outside surface 50 of second step flange 36 abuts bottom surface 25 of step 22. Second side member 34 is connectable to vehicle step 502 so that outside surface 54 of second vehicle flange 38 abuts top surface 506 of vehicle step 502.

FIG. 4 is a fragmented side elevation view of supplemental step assembly 20 connected to vehicle step 502 of vehicle 500. Supplemental step assembly 20 provides an intermediate step between the two factory installed steps 502 which are mounted to fuel tank 512. When installed as shown, supplemental step assembly 20 provides step 22 which is approximately half way between the two factory steps 502. The supplemental step gives the user another step that is a more normal stepping distance to climb in and out of the truck cab. This figure clearly shows how fuel tank 512 installed by the manufacture bows out between the top and bottom factory installed steps 502. Without the unique offset design of the side members 28 and 34, supplemental step assembly 20 would not be able to be installed to avoid fuel tank 512 and obstruction 510. But because side members 28 and 34 do have an offset design, supplemental step assembly 20 can be installed on vehicle step 502 so that it leans outward and away from obstructions 510 and fuel tank 512. Most commercial trucks have some type of factory mounted obstruction 510. The angled design of side members 28 and 34, coupled with concave edges (see discussion below) ensure that supplemental step assembly 20 can be connected to virtually any vehicle, regardless of existing obstructions. FIG. 4 also shows the shoe 600 of a user placed on the tread of step 22 (refer also to FIGS. 30-33).

Figure 2:
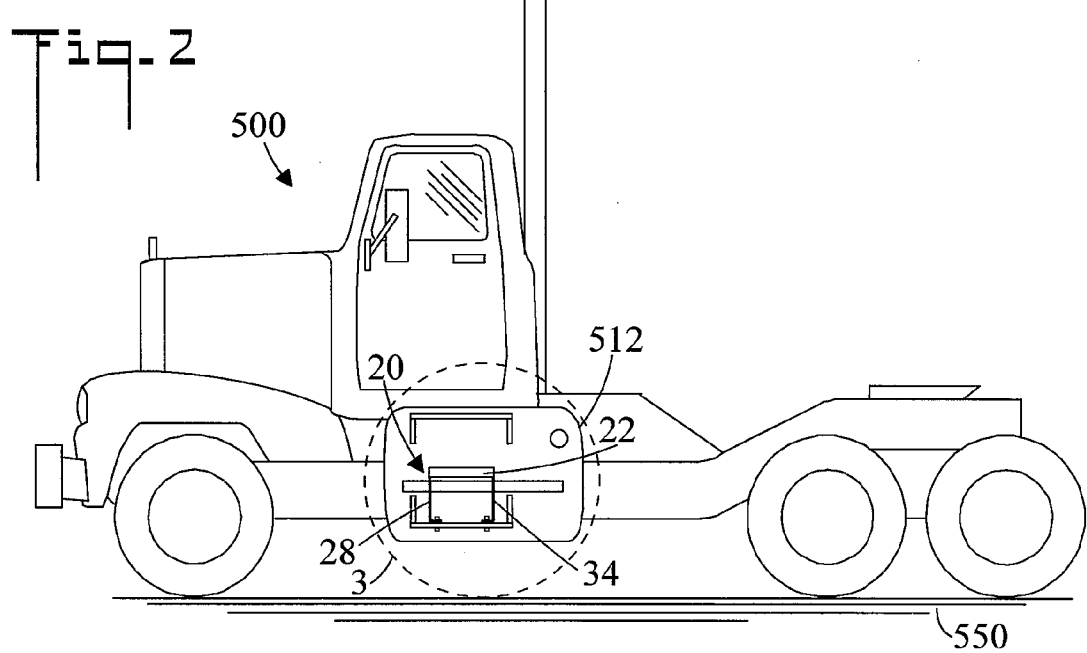
FIG. 2 is a reduced side elevation view of the supplemental step assembly connected to the vehicle step of a vehicle.

In the shown configuration, vehicle step 502 is connected to the fuel tank 512 of vehicle 500 (also refer to FIGS. 2 and 3). It is further noted that vehicle 500 has an obstruction 510 which protrudes from fuel tank 512. Also referring to FIGS. 20-24 and 25-29, first side member 28 has a concave first edge 29, and second side member 34 has a concave second edge 35. Concave first 29 and second 35 edges are shaped and dimensioned to avoid the obstruction 510. That is, edges 29 and 35 lessen the chance that an obstruction 510 will prevent or interfere with the installation of supplemental step assembly 20.

FIG. 5 is a fragmented perspective view of supplemental step assembly 20 connected to vehicle step 502 of vehicle 500. Also referring to FIGS. 20-24 and 25-29, first step flange 30 has at least one mounting hole 56 (two in the shown embodiment) for connecting first step flange 30 to step 22. Similarly, second step flange 36 has at least one mounting hole 58 (two in the shown embodiment) for connecting second step flange 36 to step 22. Bolts 60 are used to connect side members 28 and 34 to step 22 (refer also to FIG. 15).

Also referring to FIGS. 5, 20-14, and 25-29, first vehicle flange 32 includes at least one (two in the shown embodiment) first vehicle step adjustment slot 62 for connecting first vehicle flange 32 to vehicle step 502. Similarly, second vehicle flange 38 includes at least one (two in the shown embodiment) second vehicle step adjustment slot 64 for connecting second vehicle flange 38 to vehicle step 502. The connected is effected using existing holes 514 in vehicle step 502. Bolts 66 are used to make the connection of vehicle flanges 32 and 38 to vehicle step 502. As necessary a special enlarged washer 68 (refer to FIG. 6) can be utilized if holes 514 are too large for conventional washers. Vehicle step adjustment slots 62 and 64 permit the connection of supplemental vehicle step assembly 20 to be varied (in the direction of the arrows) toward or away from vehicle 500 as the need may be to accommodate various installation situations.

Referring to FIG. 5, it is noted that when first 28 and second 34 side members are connected to step 22, first 72 and second 74 adjustment slots of step 22 (also refer to FIGS. 30-33 and the associated discussion) are oriented perpendicular to first 62 and second 64 vehicle step adjustment slots of side members 28 and 34. The orientation provides adjustment flexibility when connecting supplemental step assembly 20 to vehicle step 502 of vehicle 500.

FIG. 7 is a reduced rear elevation view of two supplemental step assembles connected to vehicle step 502. In this instance vehicle step 502 is an ICC bumper which is disposed at the rear of a semi-trailer vehicle 500. FIG. 8 is an enlarged view of area 8 of FIG. 7, FIG. 9 is a side elevation view of FIG. 8, FIG. 10 is a perspective view of supplemental step assembly 20 configured for connection below a vehicle step 502, and FIG. 11 is a perspective view of two supplemental step assemblies 20 connected to the vehicle step 502. As can be seen from the figures, first 28 and second 34 side members are connectable to step 22 and to vehicle step 502 such that (1) step 22 can project upwardly from the vehicle step, or (2) step 22 can project downwardly from the vehicle step 502. As shown, two supplemental step assemblies 20 project in different directions from vehicle step 502, one projecting up and the other projecting down. This configuration provides two additional steps for the user. The upward projecting connection is as was shown and discussed in FIGS. 1-5.

Conversely for downward connection (referring also to FIGS. 20-24 and 25-29), first side member 28 is inverted and is connectable to step 22 so that inside surface 40 of first step flange 30 abuts bottom surface 25 of step 22. First side member 28 is connectable to vehicle step 502 so that outside surface 46 of first vehicle flange 32 abuts the bottom surface 508 of vehicle step 502. Similarly, second side member 34 is connectable to step 22 so that inside surface 48 of second step flange 36 abuts bottom surface 25 of step 22. Second side member 34 is connectable to vehicle step 502 so that outside surface 54 of second vehicle flange 38 abuts bottom surface 506 of vehicle step 502. When so connected step 22 downwardly projects from the vehicle step 502. It is noted that as shown for the downward connection, step 22 and side members 28 and 34 have been inverted and swapped left to right with respect to the upward connection of FIGS. 1-5.

FIGS. 12-14 are top plan, side elevation, and end elevation views respectively of supplemental step assembly 20 with first 28 and second 34 side members connected to step 22. Step 22 has a longitudinal axis 70. Step 22 includes at least one first adjustment slot 72 (two in the shown embodiment) disposed near first end 24 and oriented parallel to longitudinal axis 70. First adjustment slot 72 is for adjusting the longitudinal position of first side member 28 along step 22 in the direction of the arrows (refer also to FIGS. 16-19). Step 22 also includes at least one second adjustment slot 74 (two in the shown embodiment) disposed near second end 26 and oriented parallel to longitudinal axis 70. Second adjustment slot 74 is for adjusting the longitudinal position of second side member 34 along step 22 in the direction of the arrows (refer also to FIGS. 16-19). It is noted that because of the hole 514 pattern configuration of vehicle step 502 (refer to FIG. 5), the location of first 28 and second 34 side members may have to be adjusted in terms of width. For example, the width between the two brackets could be W as shown, or could be a lesser or greater width (refer to FIGS. 16-19). Adjustment slots 72 and 74 allow adjustment for different widths between the side members. Also, in the shown embodiment, supplemental step assembly 20 has a step height H of about 8.25 inches, which is approximately halfway between the top and bottom factory installed steps 502 (refer also to FIG. 4). FIGS. 12 and 14 also show the offset distance O between first step end 30 and first vehicle step end 32, and between second step end 36 and second vehicle step end 38.

FIG. 15 is a view along line 15-15 of FIG. 12. In the shown embodiment a square shoulder carriage bolt 60 is used to fixedly connect step 22 to first 28 and second 34 side members.

Figure 16:
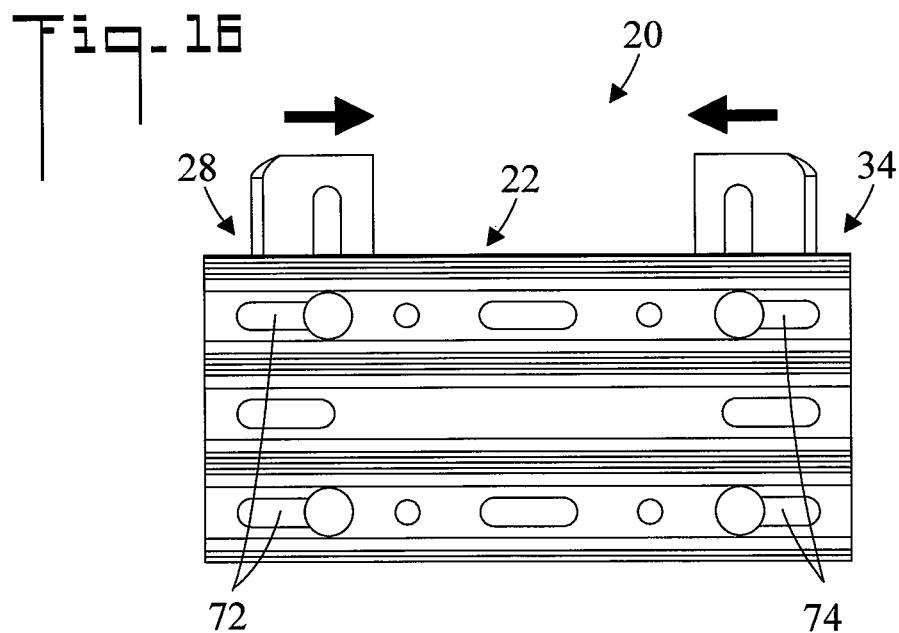
FIG. 16 is a top plan view of the supplemental step assembly showing a longitudinal adjustment of two side members.
Figure 17:
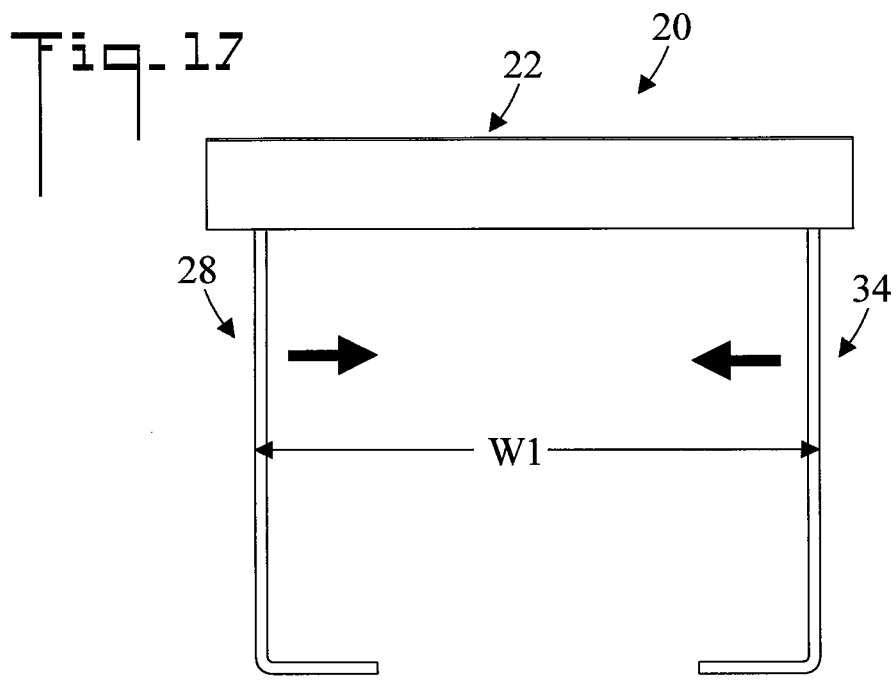
FIG. 17 is a side elevation view of the longitudinal adjustment of the two side members.

FIGS. 16 and 17 are top plan and side elevation views respectively of supplemental step assembly 20 showing a longitudinal adjustment of two side members 28 and 34. First 28 and second 34 side members have been moved toward one another along adjustment slots 72 and 74 respectively, and now have a width W1 which is less than width W of FIG. 13. It is further noted that first side member 28 and second side member 34 can be moved different distances along adjustment slots 72 and 74 respectively. For example, only first side member 28 could be moved toward second side member 34, with second side member 34 remaining in the centered position of FIGS. 12 and 13.

FIGS. 18 and 19 are top plan and side elevation views respectively of supplemental step assembly 20 showing another longitudinal adjustment of two side members 28 and 34. First 28 and second 34 side members have been moved away from one another along adjustment slots 72 and 74 respectively, and now have a width W2 which is greater than width W of FIG. 13.

FIGS. 20-24 are top plan, end elevation, bottom plan, side elevation, and perspective views respectively of first side member 28. Shown are first step end 30 (which is a flange in the shown embodiment), first vehicle step end 32 (which is a flange in the shown embodiment), concave first edge 29, inside surface 40, outside surface 42, inside surface 44, outside surface 46, mounting holes 56, first vehicle step adjustment slots 62, and rhomboid shape R.

In an embodiment, first side member 28 includes a first wall 27. First step flange 30 and first vehicle flange 32 protrude in the same direction perpendicular to first wall 27 (refer to FIG. 23). Also referring to FIGS. 1 and 5, when first step flange 30 is connected to step 22, first step flange 30 and first vehicle flange 32 protrude toward second end 26 of step 22.

FIGS. 25-29 are top plan, end elevation, bottom plan, side elevation, and perspective views respectively of second side member 34. It is noted that second side member 34 is the mirror image of first side member 28. That is, the flanges project in opposite directions. Shown are second step end 36 (which is a flange in the shown embodiment), second vehicle step end 38 (which is a flange in the shown embodiment), concave second edge 35, inside surface 48, outside surface 50, inside surface 52, outside surface 54, mounting holes 58, second vehicle step adjustment slots 64, and rhomboid shape R.

In an embodiment, second side member 34 includes a first wall 33. Second step flange 36 and second vehicle flange 38 protrude in the same direction perpendicular to secnd wall 33 (refer to FIG. 28). Also referring to FIGS. 1 and 5, when second step flange 36 is connected to step 22, second step flange 36 and second vehicle flange 38 protrude toward first end 2 of step 22.

In view of the many vehicles and their various factory-installed stair grating structures, the present supplemental step assembly 20 requires a design which will function as a universal part that can mount on most vehicles. To that end, side member 28 and 34 are offset so that supplemental step assembly 20 can be installed without interference from obstructions 510 located on the vehicle 500. The lower flanges of the side members have adjustment slots which allow flexibility in connecting the side members to the vehicle step. Since all trucks do not have the same grating, the bolt connections needs to be adjustable, and the slots on the lower flanges provide that needed adjustment. In an embodiment, the supplemental step assembly 20 is constructed of a heavy gauged aluminum (e.g. 6061-T6 for step 22 and 5052-H32 for side members 28 and 34) which sufficient strength to handle very heavy weights.

FIGS. 30-33 are top plan, side elevation, bottom plan, and end elevation views respectively of step 22. Step 22 includes a tread which has raised friction-enhancing areas 80 each of which include a plurality of ridges. Disposed between areas 80 are troughs 82 which contain adjustment slots 72 and 74. Holes 84 in troughs 82 provide for water drainage from step 22. The elevated areas 80 dig into the bottom of the user's shoe 600 and provide a solid grip and excellent traction (refer also to FIG. 4). It is noted that when side members 28 and 34 are connected to step 22, adjustment slots 72 and 74 of step 22 are perpendicular to adjustment slots 62 and 64 of side members 28 and 34 (refer also to FIGS. 5, 20-24, and 25-29).

Figure 34:
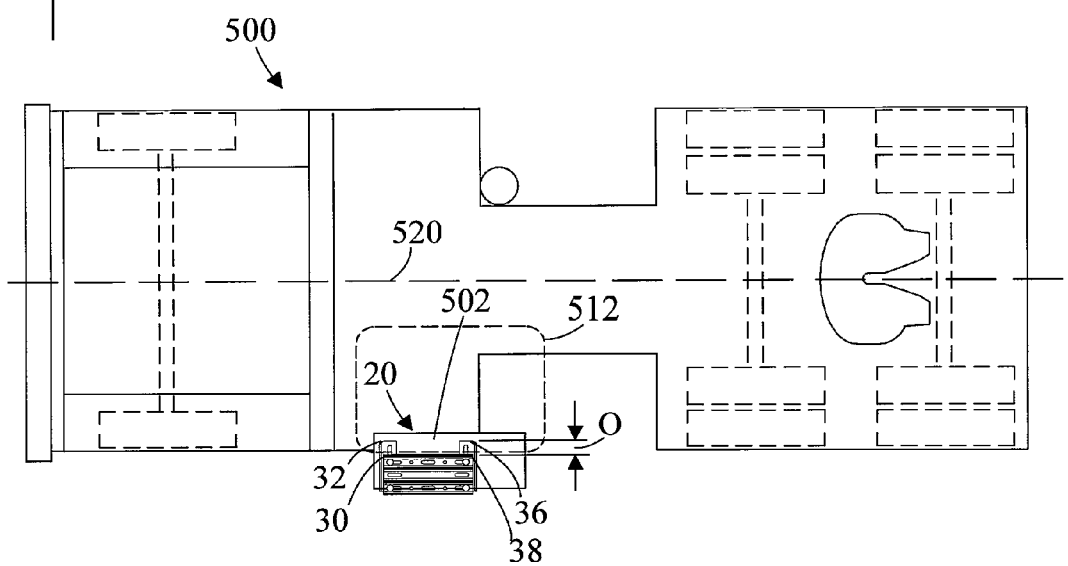

FIG. 34 is a top plan view of vehicle 500 with supplemental step assembly 20 connected. In the view fuel tank 512 is shown in dashed lines so that supplemental step assembly 20 is visible. A vertical plane 520 is disposed at the longitudinal center of vehicle 500. It is noted that first step end 30 and second step end 36 are further away (offset distand O) from vertical plane 520 than are first vehicle step end 32 and second vehicle step end 38. As such, the step 22 of supplemental step assembly 20 angles outward away from vehicle 500.

In an embodiment, supplemental step assembly 20 is combined with vehicle 500 having vehicle step 502 which has a top surface 506 and an opposite bottom surface 508 to form a supplemental step system.

In terms of use, a method for facilitating entry of a vehicle 500 includes: (refer to FIGS. 1-34)

(a) providing a vehicle 500 having a vehicle step 502, the vehicle step 502 have a top surface 504 and an opposite bottom surface 506;

(b) providing a supplemental step assembly 20 including:
a step 22 having a first end 24 and an opposite second end 26,
a first side member 28 having a first step end 30 which is connectable to the first end 24 of the step 22, and an opposite first vehicle step end 32 which is connectable to the vehicle step 502, the first step end 30 is offset from the first vehicle step end 32;
a second side member 34 having a second step end 36 which is connectable to the second end 26 of the step 22, and an opposite second vehicle step end 38 which is connectable to the vehicle step 502, the second step end 36 offset from the second vehicle step end 38;

(c) connecting the first side member 28 and the second side member 34 to the step 22;

(d) connecting the first side member 28 and the second side member 34 to the vehicle step 502; and, (e) using the supplemental step assembly 20 to enter the vehicle 500.

The method further including:
in (a), the vehicle 500 having an obstruction 510;
in (b), the first side member 28 having a concave first edge 29;
in (b), the second side member 34 having a concave second edge 35;
in (b), the concave first 29 and second 35 edges shaped and dimensioned to avoid the obstruction 510;
in (d), connecting the first side member 28 and the second side member 34 to the vehicle step 502 so that the first 28 and second 34 side members avoid the obstruction 510.

The method further including:
in (b) the first side member 28 including a first vehicle flange 32 which has at least one first adjustment slot 62;
in (b) the second side member 34 including a second vehicle flange 38 which has at least one second adjustment slot 64; and,
in (d) using the adjustment slots 62 and 64 to connect the first 28 and second 34 side members to a desired position on the vehicle step 502.

The method further including:
in (b), the step 22 having a top surface 23 and an opposite bottom surface 25;
in (c), connecting the first 28 and second 34 side members to the step 22 so that the top surface 23 of the step faces away from the first 28 and second 34 side members; and,
in (d), connecting the first side member 28 and the second side member 34 to the top surface 504 of the vehicle step 502 so that the step 22 upwardly projects from the vehicle step 22.

The method further including:
in (b), the step 22 having a top surface 23 and an opposite bottom surface 25;
in (c), connecting the first 28 and second 34 side members to the step 22 so that the bottom surface 25 of the step 22 faces away from the first 28 and second 34 side members; and,
in (d), connecting the first side member 28 and the second side member 34 to the bottom surface 506 of the vehicle step 502 so that the step 22 downwardly projects from the vehicle step 502.

The method further including:
in (b) the step 22 having a longitudinal axis 70;
in (b), the step 22 including at least one first adjustment slot 72 disposed near the first end 24 and oriented parallel to the longitudinal axis 70;
in (b), the first adjustment slot 72 for adjusting the longitudinal position of the first side member 28 along the step 22;
in (b), the step including at least one second adjustment slot 74 disposed near the second end 26 and oriented parallel to the longitudinal axis 70;
in (b), the second adjustment slot 74 for adjusting the longitudinal position of the second side member 34 along the step 22; and,
in (c), using the first 72 and second 74 adjustment slots to adjust the longitudinal position of the first 28 and second 34 side members along the step 22.

In summary, the supplemental step assembly is a practical stepping tool which greatly benefits the user. Users typically climb in and out of their truck cabs 10 times a day if not more. The climbing creates wear and tear on the body and its joints over the course of the driver's career. The larger than normal climbing distance contribute to a workers joint and muscle failure over a long period of time, making it challenging for many of them to continue in this line of employment. The supplemental step assembly can be a benefit by making their day to day employment easier and safer.

The embodiments of the supplemental step assembly and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the supplemental step assembly and method of use should be construed as limiting the invention to a particular embodiment or combination of embodiments. The scope of the invention is defined by the appended claims.

I claim:

1. A supplemental step assembly for a vehicle having a vehicle step, the vehicle step having a top surface and an opposite bottom surface, the supplemental step assembly comprising:
a step having a first end and an opposite second end;

a first side member having a first step end which is connectable to said first end of said step, and an opposite first vehicle step end which is connectable to the vehicle step, said first step end offset from said first vehicle step end;

a second side member having a second step end which is connectable to said second end of said step, and an opposite second vehicle step end which is connectable to the vehicle step, said second step end offset from said second vehicle step end;

said first step end being a first step flange which is connectable to said first end of said step, said first step flange having an inside surface and an opposite outside surface;

said first vehicle step end being a first vehicle flange which is connectable to the vehicle step, said first vehicle flange having an inside surface and an opposite outside surface;

said second step end being a second step flange which is connectable to said second end of said step, said second step flange having an inside surface and an opposite outside surface;

said second vehicle step end being a second vehicle flange which is connectable to the vehicle step, said second vehicle flange having an inside surface and an opposite outside surface;

said step having a top surface and an opposite bottom surface;

said first side member connectable to said first end of said step so that said outside surface of said first step flange abuts said bottom surface of said step;

said first side member connectable to the vehicle step so that said outside surface of said first vehicle flange abuts the top surface of the vehicle step;

said second side member connectable to said second end of said step so that said outside surface of said second step flange abuts said bottom surface of said step;

said second side member connectable to the vehicle step so that said outside surface of said second vehicle flange abuts the top surface of the vehicle step; and, when so connected said step upwardly projects from the vehicle step.

2. A supplemental step assembly for a vehicle having a vehicle step, the vehicle step having a top surface and an opposite bottom surface, the supplemental step assembly comprising:

a step having a first end and an opposite second end;

a first side member having a first step end which is connectable to said first end of said step, and an opposite first vehicle step end which is connectable to the vehicle step, said first step end offset from said first vehicle step end;

a second side member having a second step end which is connectable to said second end of said step, and an opposite second vehicle step end which is connectable to the vehicle step, said second step end offset from said second vehicle step end;

said first step end being a first step flange which is connectable to said first end of said step, said first step flange having an inside surface and an opposite outside surface;

said first vehicle step end being a first vehicle flange which is connectable to the vehicle step, said first vehicle flange having an inside surface and an opposite outside surface;

said second step end being a second step flange which is connectable to said second end of said step, said second step flange having an inside surface and an opposite outside surface;

said second vehicle step end being a second vehicle flange which is connectable to the vehicle step, said second vehicle flange having an inside surface and an opposite outside surface;

said step having a top surface and an opposite bottom surface;

said first side member connectable to said step so that said inside surface of said first step flange abuts said bottom surface of said step;

said first side member connectable to the vehicle step so that said outside surface of said first vehicle flange abuts the bottom surface of the vehicle step;

said second side member connectable to said step so that said inside surface of said second step flange abuts said bottom surface of said step;

said second side member connectable to the vehicle step so that said outside surface of said second vehicle flange abuts the bottom surface of the vehicle step; and, when so connected said step downwardly projects from the vehicle step.

3. A supplemental step system for a vehicle, comprising:

a vehicle having a vehicle step, said vehicle step have a top surface and an opposite bottom surface;

a supplemental step assembly including:

a step having a first end and an opposite second end, a first side member having a first step end which is connectable to said first end of said step, and an opposite first vehicle step end which is connectable to said vehicle step, said first step end offset from said first vehicle step end;

a second side member having a second step end which is connectable to said second end of said step, and an opposite second vehicle step end which is connectable to said vehicle step, said second step end offset from said second vehicle step end;

said first step end being a first step flange which is connectable to said first end of said step, said first step flange having an inside surface and an opposite outside surface;

said first vehicle step end being a first vehicle flange which is connectable to said vehicle step, said first vehicle flange having an inside surface and an opposite outside surface;

said second step end being a second step flange which is connectable to said second end of said step, said second step flange having an inside surface and an opposite outside surface;

said second vehicle step end being a second vehicle flange which is connectable to said vehicle step, said second vehicle flange having an inside surface and an opposite outside surface;

said step having a top surface and an opposite bottom surface;

said first side member connectable to said first end of said step so that said outside surface of said first step flange abuts said bottom surface of said step;

said first side member connectable to said vehicle step so that said outside surface of said first vehicle flange abuts said top surface of said vehicle step;

said second side member connectable to said second end of said step so that said outside surface of said second step flange abuts said bottom surface of said step;

said second side member connectable to said vehicle step so that said outside surface of said second vehicle flange abuts the said top surface of the said vehicle step; and, when so connected said step upwardly projects from said vehicle step.

4. A supplemental step system for a vehicle, comprising:

a vehicle having a vehicle step, said vehicle step have a top surface and an opposite bottom surface;

a supplemental step assembly including:

a step having a first end and an opposite second end, a first side member having a first step end which is connectable to said first end of said step, and an opposite first vehicle step end which is connectable to said vehicle step, said first step end offset from said first vehicle step end;

a second side member having a second step end which is connectable to said second end of said step, and an opposite second vehicle step end which is connectable to said vehicle step, said second step end offset from said second vehicle step end;

said first step end being a first step flange which is connectable to said first end of said step, said first step flange having an inside surface and an opposite outside surface;

said first vehicle step end being a first vehicle flange which is connectable to said vehicle step, said first vehicle flange having an inside surface and an opposite outside surface;

said second step end being a second step flange which is connectable to said second end of said step, said second step flange having an inside surface and an opposite outside surface;

said second vehicle step end being a second vehicle flange which is connectable to said vehicle step, said second vehicle flange having an inside surface and an opposite outside surface;

said step having a top surface and an opposite bottom surface;

said first side member connectable to said step so that said inside surface of said first step flange abuts said bottom surface of said step;

said first side member connectable to said vehicle step so that said outside surface of said first vehicle flange abuts said bottom surface of said vehicle step;

said second side member connectable to said step so that said inside surface of said second step flange abuts said bottom surface of said step;

said second side member connectable to the said vehicle step so that said outside surface of said second vehicle flange abuts said bottom surface of said vehicle step; and, when so connected said step downwardly projects from said vehicle step.

5. A method for facilitating entry of a vehicle, comprising:

(a) providing a vehicle having a vehicle step, said vehicle step have a top surface and an opposite bottom surface;

(b) providing a supplemental step assembly including:

a step having a first end and an opposite second end, a first side member having a first step end which is connectable to said first end of said step, and an opposite first vehicle step end which is connectable to said vehicle step, said first step end offset from said first vehicle step end;

a second side member having a second step end which is connectable to said second end of said step, and an opposite second vehicle step end which is connectable to said vehicle step, said second step end offset from said second vehicle step end;

(c) connecting said first side member and said second side member to said step;

(d) connecting said first side member and said second side member to said vehicle step;

(e) using said supplemental step assembly to enter said vehicle;

in (b), said step having a top surface and an opposite bottom surface;

in (c), connecting said first and second side members to said step so that said top surface of said step faces away from said first and second side members; and, in (d), connecting said first side member and said second side member to said top surface of said vehicle step so that said step upwardly projects from said vehicle step.

6. A method for facilitating entry of a vehicle, comprising:

(a) providing a vehicle having a vehicle step, said vehicle step have a top surface and an opposite bottom surface;

(b) providing a supplemental step assembly including:

a step having a first end and an opposite second end, a first side member having a first step end which is connectable to said first end of said step, and an opposite first vehicle step end which is connectable to said vehicle step, said first step end offset from said first vehicle step end;

a second side member having a second step end which is connectable to said second end of said step, and an opposite second vehicle step end which is connectable to said vehicle step, said second step end offset from said second vehicle step end;

(c) connecting said first side member and said second side member to said step;

(d) connecting said first side member and said second side member to said vehicle step;

(e) using said supplemental step assembly to enter said vehicle;

in (b), said step having a top surface and an opposite bottom surface;

in (c), connecting said first and second side members to said step so that said bottom surface of said step faces away from said first and second side members; and, in (d), connecting said first side member and said second side member to said bottom surface of said vehicle step so that said step downwardly projects from said vehicle step.

* * * * *